: US 8,842,601 B2
(45) Date of Patent: Sep. 23, 2014

(12) United States Patent
Zhou et al.

(54) METHOD AND DEVICE FOR DETECTING PRIMARY SYNCHRONIZATION SIGNAL AND GENERATING SEQUENCE IN LONG TERM EVOLUTION (LTE) SYSTEM

(75) Inventors: Peng Zhou, Shenzhen (CN); Yuefeng Chen, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 97 days.

(21) Appl. No.: 13/521,869

(22) PCT Filed: Sep. 17, 2010

(86) PCT No.: PCT/CN2010/077073
§ 371 (c)(1),
(2), (4) Date: Jul. 12, 2012

(87) PCT Pub. No.: WO2011/095010
PCT Pub. Date: Aug. 11, 2011

(65) Prior Publication Data
US 2012/0281629 A1    Nov. 8, 2012

(30) Foreign Application Priority Data
Feb. 5, 2010  (CN) .......................... 2010 1 0111963

(51) Int. Cl.
*H04B 7/212*    (2006.01)
*H04L 27/26*    (2006.01)
*H04J 13/14*    (2011.01)
*H04J 11/00*    (2006.01)
*H04L 1/00*    (2006.01)
*H04B 1/00*    (2006.01)
*H03D 1/00*    (2006.01)
*H04L 27/06*    (2006.01)
*H04B 7/00*    (2006.01)
*H04B 15/00*    (2006.01)

(52) U.S. Cl.
CPC ......... *H04J 11/0073* (2013.01); *H04L 27/2692* (2013.01); *H04J 13/14* (2013.01); *H04L 27/2643* (2013.01); *H04L 27/2613* (2013.01); *H04L 27/2655* (2013.01)

USPC .......... 370/324; 370/329; 375/130; 375/343; 455/502

(58) Field of Classification Search
CPC .............. H04L 5/0053; H04L 27/2663; H04L 27/2671
USPC .................... 375/130, 343; 370/329; 455/502
See application file for complete search history.

(56) References Cited

U.S. PATENT DOCUMENTS

2010/0020850 A1*  1/2010  Navarro Rodero et al. ... 375/130
2010/0069106 A1*  3/2010  Swarts et al. ................. 455/502

(Continued)

FOREIGN PATENT DOCUMENTS

CN    101341708 A    1/2009
CN    101641924 A    2/2010

OTHER PUBLICATIONS

International Search Report for PCT/CN2010/077073.

(Continued)

*Primary Examiner* — Helal A Algahaim
*Assistant Examiner* — Mahmoud Ismail
(74) *Attorney, Agent, or Firm* — McClure, Qualey & Rodack, LLP

(57) ABSTRACT

The present invention discloses a method and a device for detecting a primary synchronization signal and generating a sequence in a LTE system, so as to solve the problem that the overhead for 3GPP LTE system to store a local primary synchronization sequence is too much during the initial cell search process. The method for detecting a primary synchronization signal includes: directly generating a local primary synchronization signal sequence with equal amplitude in the time domain as a matched filter; performing a front-end processing for a received signal; performing the matched filtering between the received signal after the front-end processing and the local primary synchronization signal sequence; judging the output amplitude of the signal sequence obtained after the matched filtering; and then obtaining a judgment result of the local primary synchronization signal sequence.

11 Claims, 3 Drawing Sheets

(56) References Cited

U.S. PATENT DOCUMENTS

2010/0284358 A1* 11/2010 Han et al. .................. 370/329
2012/0281792 A1* 11/2012 Swarts et al. .............. 375/343

OTHER PUBLICATIONS

Li xiaowen et al. Study on the frequency offset estimation of LTE synchronization signal based on DSP, Application of Electronic Technique, 2009, No. 10, Oct. 31, 2009.

"Primary Synchronization Codes (PCS) for E-Utra" NEC Group; 3GPPTSG RAN WG1 #48; St Louis, Missouri, USA; Feb. 12-16, 2007; pp. 1-7.

"On ZC-based PSC and Frequency Offset"; Marvell Semiconductor; 3GPP TSG RAN WG1 #49; Kobe, May 7-11, 2007; pp. 1-10.

"P-SCH Sequence Design for Single and Multiple PSCs"; LG Electronics; 3GPP TSG RAN WG1 #47 bis; Sorrento, Italy; Jan. 15-19, 2007: pp. 1-25.

* cited by examiner

METHOD AND DEVICE FOR DETECTING PRIMARY SYNCHRONIZATION SIGNAL AND GENERATING SEQUENCE IN LONG TERM EVOLUTION (LTE) SYSTEM

CROSS REFERENCE RELATED APPLICATIONS

This application is a national phase of PCT/CN2010/077073 filed Sep. 17, 2010, which claims priority to China Application Serial No. 201010111963.0, filed Feb. 5, 2010, both of which are entirely incorporated herein by reference.

TECHNICAL FIELD

The present invention relates to the digital signal processing and signal detection and estimation field in the wireless communication, and specifically, to a method and a device for detecting a primary synchronization signal and generating a sequence in a LTE system.

BACKGROUND OF THE RELATED ART

In order to respond to the challenges of the broadband technology, and to meet requirements of new services, the third generation partner project (3GPP) puts forwards the standard work of long term evolution (LTE) plan, that is LTE technology, based on a dozen years of research of the beyond 3G technology. LTE adopts Frequency Division Multiple Access (OFDM/FDMA) instead of Code Division Multiple Access (CDMA) technology in the air interface, and extensively uses the multiple-input multiple-output (MIMO) technology and self-adaptive technology to improve the system throughput and system performance; in terms of the network architecture, LTE cancels radio network control (RNC) nodes used in the UMTS standard for a long time, and replaces them with a new flat architecture. It is believed that the 3GPP standard should maintain a competitive advantage to other radio communication standards for a relative long time by means of the LTE technology.

An initial cell search process is a key physical process for user equipment (UE) to establish a communication link with a base station in a cellular radio system, and the main purpose is to let the user equipment capture the time of the cell and synchronize with the frequency, and recognize the identification number of the local cell as well as some basic information of the cell broadcast at the same time. The basic step of the initial cell search process in a LTE system comprises: 1) UE performs a cell search in the center frequency band of the receiving band, and obtains a timing as well as cell identification information according to the Synchronization CHannel (SCH); 2) broadcast channel (BCH) information is detected based on the timing information maintained by the SCH with the base station, so as to obtain other configuration information of the cell; 3) and then UE receives and transmits data in the allocated frequency band according to the obtained broadcast control information. For the SCH signal detection, the LTE system adopts a hierarchical synchronization search mechanism, namely, a primary synchronization channel (P-SCH) and Secondary Synchronization Channel (S-SCH). Synchronization signal of the primary synchronization channel adopts three kinds of Zadoff-Chu (ZC) sequences in the frequency domain, mainly to identify the group identification number or sector number of the cell, and to perform frequency synchronization as well as 5 ms timing synchronization. At the same time, the primary synchronization signal is also taken as a pilot sequence for channel estimation when the secondary synchronization channel performs coherent detection; while the synchronization signal of the secondary synchronization channel is formed by making two short binary sequences interwoven and mapped, and the main function thereof is detecting the group identification number of the cell and synchronizing the frame timing. The UE obtains the cell number by detecting the synchronization channel, so as to acquire a reference signal in the system, and then performs coherent detection and decoding for the broadcasting channel, so as to obtain the broadcast information of the cell at last. The P-SCH and S-SCH adopts a Time Division Multiplexing mode, which transmits a radio frame twice per 10 ms. For the P-SCH, the same sequence is transmitted for the adjacent twice of transmission to implement 5 ms timing; for the S-SCH, the different sequences are transmitted for the adjacent twice of transmission to implement a radio frame timing synchronization of 10 ms. Synchronization channel occupies 62 subcarriers of the center except direct current subcarrier, and there are 5 virtual subcarriers respectively on both sides as protection bands. The broadcast information is mapped into the first subframe of each radio frame by means of encoding, rate matching, scrambling and modulation. The transmission cycle of the broadcast signal is 40 ms, the physical channel occupies 72 subcarriers except the direct current subcarrier, and the system bandwidth is 1.08 MHz. Since the synchronization channel and the broadcast channel are located on the 72 subcarriers of the center of the frequency domain, the UE is not required to have prior information of the system bandwidth during the initial cell searching.

The frequency domain signal sequence of the primary synchronization channel in LTE system, namely the primary synchronization sequence, is ZC sequence, and is expressed as:

$$d_u(n) = \begin{cases} e^{-j\pi \frac{un(n+1)}{63}} & n = 0, 1, \ldots, 30 \\ e^{-j\pi \frac{u(n+1)(n+2)}{63}} & n = 31, 32, \ldots, 61 \end{cases} \quad \text{Formula 1}$$

Wherein, the ZC root sequence indexes of u=25, 29, 34 represent the cell sector number of $N_{ID}^{(2)}$=0, 1, 2 respectively. The primary synchronization is mapped into 62 low-frequency subcarriers except the one of k=0, that is, k=−31, −30, . . . −1,1, . . . , 30,31, and there are 5 subcarriers before and after them without transmitting any signals.

The classic primary synchronization signal detection method is adopting a time domain detection algorithm, that is, the local primary synchronization signal sequence index, namely the sector number of the local cell, transmitted by the base station side is determined by performing a matched filtering between the received signal and the local primary synchronization signal sequence, and by detecting the output amplitude of the matched filter.

The local primary synchronization sequence is generated by performing 64-point IFFT (Inverse Fast Fourier Transform) on the sequences of 62 subcarriers other than the direct current subcarrier, which are mapped onto the central frequency band, into the time domain during the traditional primary synchronization signal detection; and the generation method can be expressed as the following formula:

$$x_u(n) = \frac{1}{\sqrt{64}} \sum_{k=-31, k \neq 0}^{31} d_u(k+31) \cdot e^{j2\pi \frac{nk}{64}}, \quad \text{Formula 2}$$

$$= n = 0, 1, \ldots, 63$$

-continued $$= \frac{1}{\sqrt{64}} \sum_{k=-31, k\neq 0}^{31} e^{-j\pi \frac{u(k+31)(k+32)}{63}} \cdot e^{j2\pi \frac{nk}{64}},$$

$$= n = 0, 1, \ldots, 63$$

Wherein, $$d_u(k) = e^{-j\pi u \frac{k(k+1)}{63}},$$

k=0, 1, ..., 62, that is a ZC sequence whose root sequence number is u, and whose sequence length is $N_{ZC}$=63.

However, the storage overhead of the local registers is found too much during the primary synchronization signal detection.

SUMMARY OF THE INVENTION

The present invention provides a method and a device for detecting a primary synchronization signal and generating a sequence in a LTE system, and solves the problem that the overhead for 3GPP LTE system to store a local primary synchronization sequence is too much during the initial cell search process.

The present invention provides a method for detecting a primary synchronization signal in a Long Term Evolution (LTE) system, comprising:

directly generating a local primary synchronization signal sequence with equal amplitude in time domain as a matched filter; and performing a front-end processing for a received signal; performing matched filtering between the received signal after the front-end processing and the local primary synchronization signal sequence; judging output amplitude of the signal sequence obtained after the matched filtering; and then obtaining a judgment result of the local primary synchronization signal sequence.

The front-end processing may comprise an analog-digital conversion, an automatic gain control, a low-pass filtering and rate transform; and a sampling rate of the received signal after the front-end processing is 0.96 MHz.

The local primary synchronization signal sequence may be generated by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62$$

wherein, θ(u)=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63. The method may further comprise: splitting the local primary synchronization signal sequence to be in M channels after generating the local primary synchronization signal sequence: the local primary synchronization signal sequence of an $i^{th}$ channel is $x_u$*(n)$e^{j2\pi \xi_i n/63}$, wherein, n=0, 1, ..., 62, $\xi_i$ is a preset normalized frequency deviation factor of the $i^{th}$ channel.

The step of judging output amplitude of the signal sequence obtained after the matched filtering and obtaining a judgment result of the local primary synchronization signal may comprise: judging the output amplitude output from the matched filter, and selecting a sequence number corresponding to a sequence meeting a condition of a preset amplitude peak to be taken as a sequence index of the primary synchronization signal sequence of a transmitted signal; obtaining by calculation a rough estimate of a channel carrier frequency deviation: $\Delta \hat{f} = -\xi_i \times 15000$ MHz according to a normalized frequency deviation factor of the sequence meeting the condition of the preset amplitude peak.

The method may further comprise: before the judgment, performing a plurality of merging and averaging of 5 ms radio half-frames on the signal sequence obtained after the matched filtering, and then judging the result of merging and averaging of the radio half-frames.

The present invention also provides a method for generating a primary synchronization signal sequence in a Long Term Evolution (LTE) system, comprising: directly generating a local primary synchronization signal sequence with equal amplitude in time domain.

Preferably, the local primary synchronization signal sequence with equal amplitude is directly generated in the time domain by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62;$$

Wherein, θ(u)=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63.

The present invention also provides a device for detecting a primary synchronization signal in a Long Term Evolution (LTE) system, comprising a local sequence generation unit, a front-end processing unit, a filtering unit and a judging unit, wherein:

the local sequence generation unit is configured to generate a local primary synchronization signal sequence with equal amplitude in time domain as a matched filter directly;

the front-end processing unit is configured to perform a front-end processing on a received signal, and to transmit the received signal after being processed to the filtering unit;

the filtering unit is configured to perform a matched filtering between the received signal after the front-end processing and the local primary synchronization signal sequence, and to transmit the signal sequence obtained after the matched filtering to the judging unit;

the judging unit is configured to judge output amplitude of the signal sequence obtained after the matched filtering, so as to obtain a judgment result of the primary synchronization signal sequence.

The front-end processing unit may be configured to perform the following front-end processing on the received signal: an analog-digital conversion, an automatic gain control, a low-pass filtering and rate transform; a sampling rate of the received signal after the front-end processing may be 0.96 MHz.

The local sequence generation unit may be configured to generate the local primary synchronization signal sequence by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62;$$

wherein, θ(u)=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63. The local sequence generation unit may be further configured to split the local primary synchronization signal sequence to be in M channels after generating the local primary synchronization signal sequence: the local primary synchronization signal sequence of an $i^{th}$ channel being $x_u^*(n)e^{j2\pi\xi_i n/63}$, wherein, n=0, 1, ..., 62, $\xi_i$ is a preset normalized frequency deviation factor of the $i^{th}$ channel. The device may further comprise a half-frame merging unit, the half-frame merging unit may be configured: to receive the signal sequence sent by the matched filtering unit after the matched filtering, to perform a plurality of merging and averaging of 5 ms radio half-frames on the signal sequence obtained after the matched filtering, and to transmit the result of merging and averaging of the radio half-frames to the judgment unit to be judged.

The method of the present invention directly generates a local sequence with equal amplitude in the time domain, therefore can save the storage space, at the same time the IFFT operation in the traditional scheme is also avoided, thus effectively reducing the computational complexity in the case that the detection performance remains unchanged largely. In particular, for the multi-channel parallel detection scheme, the method for generating a local synchronization sequence of the present invention has a more obvious advantage in saving the storage space and reducing the computational complexity. At the same time, the robustness of the carrier frequency is enhanced by the multi-channel parallel detection. The present invention is applicable to the initial cell search in a LTE system of both FDD and TDD duplex structure at the same time, with a good value of the engineering application.

PREFERRED EMBODIMENTS OF THE PRESENT INVENTION

Figure 1:
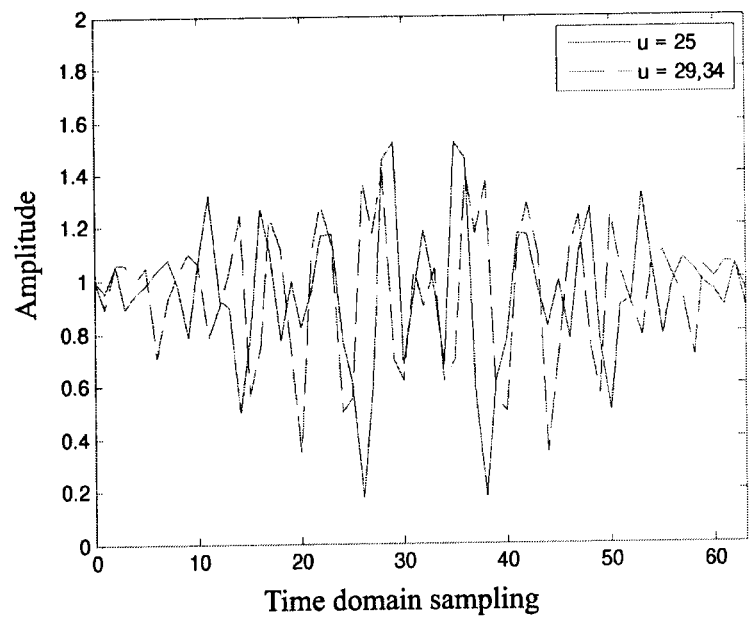
FIG. 1 is a schematic diagram of the amplitude of a traditional local primary synchronization sequence.

By means of the analysis, it is found that the traditional local primary synchronization signal sequence will increase the storage overhead of the local registers since amplitude is not identical.

The invention concept of a method for generating a local primary synchronization signal sequence of the present invention is: directly generating the local primary synchronization signal sequence with equal amplitude from the time domain.

Preferably, the local primary synchronization signal sequence is generated by using the following formula:

$$x_u(n) = e^{-j2\pi\frac{31n+\theta(u)}{63}} e^{-j\pi u\frac{(-n\times u^{-1})(-n\times u^{-1}+1)}{63}}, n = 0, 1, \ldots, 62;$$

$\theta(u)$ and $u^{-1}$ when u=25, 29, 34, are acquired; Here, $u^{-1}$ refers to the multiplicative inverse of u mod $N_{ZC}(N_{ZC}=63)$, $\theta(u)=4.75, -27.25, 27.25, u^{-1}=28, 50, 13$.

The invention concept of a method for detecting a primary synchronization signal of the present invention is: directly generating a local primary synchronization signal sequence with equal amplitude in the time domain as a matched filter; performing a front-end processing on a received signal; performing the matched filtering between the received signal after the front-end processing and the local primary synchronization signal sequence; judging the output amplitude of the signal sequence obtained after the matched filtering; and then obtaining a detection result of the primary synchronization signal sequence.

The methods of the present invention will be illustrated in further detail step by step hereinafter.

In step a, a local primary synchronization signal sequence with equal amplitude is directly generated in the time domain;

the amplitude of the generated local primary synchronization signal sequence always equals to 1, and the length of the sequence is 63.

The generation process is as follows:

$$x_u(n) = \frac{1}{\sqrt{63}} \sum_{k=-31}^{31} d_u(k+31) \cdot e^{j2\pi\frac{nk}{63}} \quad \text{Formula 3}$$

$$= \frac{1}{\sqrt{63}} \sum_{k=0}^{62} d_u(k) e^{j2\pi\frac{n(k-31)}{63}}$$

$$= e^{-j2\pi\frac{31n}{63}} X_u(n),$$

$$= n = 0, 1, \ldots, 62$$

wherein, $X_u(n)$ is the IDFT (Inverse Discrete Fourier Transform) of the ZC sequence, namely, the local primary synchronization sequence. And:

$$X_u(n) = d_u^*(u^{-1}\bar{n})X_u(0) \quad \text{Formula 4}$$

$$= e^{-j\pi u\frac{(u^{-1}\bar{n})(u^{-1}\bar{n}+1)}{63}} \sum_{k=0}^{62} e^{j\pi u\frac{k(k+1)}{63}}$$

$\bar{x}$ and $x^{-1}$ in the above formula respectively refer to the additive inverse element and multiplicative inverse element of the x mod $N_{ZC}$, $d_u$ is the ZC sequence, and * refers to the conjugate. Therefore, generating the local primary synchronization signal sequence in the time domain can be directly expressed as the following formula:

$$x_u(n) = e^{-j2\pi\frac{31n+\theta(u)}{63}} e^{-j\pi u\frac{(-n\times u^{-1})(-n\times u^{-1}+1)}{63}}, n = 0, 1, \ldots, 62 \quad \text{Formula 5}$$

Wherein, $\theta(u)$ and $u^{-1}$ are respectively $\theta(u)=4.75, -27.25, 27.25$ and $u^{-1}=28, 50, 13$, when u=25, 29, 34.

In the step, the generation of the local primary synchronization signal sequence is directly performed in the time domain; therefore the IFFT operation in the traditional generation method can be avoided. In addition, it can be seen from the formula 5, the obtained synchronization sequence is of equal amplitude which always equals to 1, due to completely exponential function; therefore only the phase information of the sequence is required to be stored, thus greatly reducing the storage overhead. Additionally, the storage overhead of the local synchronization signal sequence will be further reduced at this time, taking into account the following two characters: $x_u(n)=x_u(63-n)$ and $x_{34}(n)=x_{29}^*(n)$.

The traditional method ignores the subcarrier of zero, and the length of the sequence is defined as 64, while the root sequence of the ZC sequence specified in the protocol is 63, therefore, the local primary synchronization sequence generated in the traditional method must be non-equal amplitude. While the present invention takes advantage of the root sequence of the ZC sequence being 63, and takes into account the ignored subcarrier of zero, hence the local primary synchronization sequence directly generated in the time domain is of equal amplitude.

In step b, a splitting is performed on the generated local primary synchronization signal sequence;

the step b may not be executed in other embodiments.

Specifically, the generated local primary synchronization signal sequence is split to be in M channels, and M channels of the local primary synchronization signal sequences correspond to M matched filers; thus one channel of the local primary synchronization signal sequence only corresponds to one matched filter if the splitting is not performed. The local primary synchronization signal sequence of the $i^{th}$ ($i$($i$=1, 2, ..., M)) channel is $x_u^*(n)e^{j2\pi\xi_i n/63}$, n=0, 1, ..., 62, wherein, $\xi_i=\Delta f/15000$, $-1<\xi_i<1$, $\xi_i$ is the preset normalized frequency deviation factor of the $i^{th}$ channel. Preferably, the local primary synchronization signal sequence of each channel can be simplified to the phase rotation of $x_u^*(n)$, that is, at this time the local primary synchronization signal sequence is generated through performing the phase rotation on the local primary synchronization signal sequence obtained in the step b, thus the implementation complexity is limited.

Since the inherent subcarrier frequency deviation in the system may result in uncontrollable performance loss for the primary synchronization signal detection, adopting the multi-channel parallel detection scheme (that is including the technical scheme of the step b) at the receiver side, can enhance the robustness for the filter frequency deviation, that is, the carrier frequency offset affecting on the performance of primary synchronization signal detection is reduced, and the detection performance is improved.

In addition, a rough estimate of the carrier frequency deviation can be obtained by means of the parallel detection for a plurality of channels of the local primary synchronization signals, after splitting; and the frequency deviation in the channel can be compensated according to the rough estimate of the carrier frequency deviation, so as to perform a signal detection and estimation of the next step in the initial cell search.

In step c, the front-end processing is performed on the received signal after the signal is received, so as to make the sample rate of the received signal be 0.96 MHz;

The broadcast channel occupies all of 72 subcarriers, and the system bandwidth is 1.08 MHz, therefore the broadcast channel detection must be completed at the sample rate of 1.92 MHz. In order to reduce the implementation complexity of the receiver and storage overhead of the filter, a multi-rate signal processing is performed on the received signal during the initial cell search process, so as to make the sample rate be 1.92 MHz and the signal bandwidth set to be no less than 1.08 MHz at least; and then a twice down sampling is carried out for the received signal to make the sampling rate become 0.96 MHz, thus meeting the sampling and bandwidth requirements during the synchronization channel detection as well as the broadcast channel detection, and simplifying the implementation structure of the receiver.

Other rate transform methods can be adopted in other embodiments, as long as the sampling rate of the received signal is made 0.96 MHz.

The aforementioned steps of a, b, c can be executed in any order, as long as the local primary synchronization signal sequence is guaranteed to have been generated before the correlation operation.

In step d, a matched filtering, namely correlation operation, is performed between the received signal after the rate transform and the local primary synchronization signal sequence, and the detection result of the primary synchronization signal sequence is obtained according to the filtering result;

The correlation operation is performed between the received signal after the rate transform and each channel, if there are multiple channels of the local primary synchronization signal sequences.

Specifically, the generated multiple channels of the local primary synchronization signal sequences pass the multi-channel matched filter, the amplitudes output from the matched filter are judged, and the sequence number corresponding to the sequence which meets the preset condition of the amplitude peak (such as the maximum amplitude peak) is selected as the sequence index of the primary synchronization signal sequence of the transmitted signal; and then the rough estimate of the channel carrier frequency deviation is obtained by calculation according to the normalized frequency deviation factor of the sequence, that is $\Delta \hat{f}=-\xi_i \times 15000$ Hz.

The local primary synchronization sequence is a set of exponential sequence, the algorithm of the CORDIC (coordinate rotation digital computer) can be adopted for the matched filtering between the received signal and the local primary synchronization sequence, therefore the matched filtering here does not need a multiplier, thus further reducing hardware computing resources.

Preferably, the correct detection probability is improved by performing the merging and averaging of 5 ms radio half-frames on the signal sequence obtained after the matched filtering, so that the performance for detecting the primary synchronization signal is improved. The merging of radio half-frames refers to making the sum of the absolute value of the results which are obtained by performing a plurality of filtering on the local synchronization signal sequence of each channel. A plurality of merging and averaging of 5 ms radio half-frames has a more practical value on reducing the implementation complexity and the storage overhead for the receiver to generate the local primary synchronization sequence during the initial cell search process.

Figure 2A:
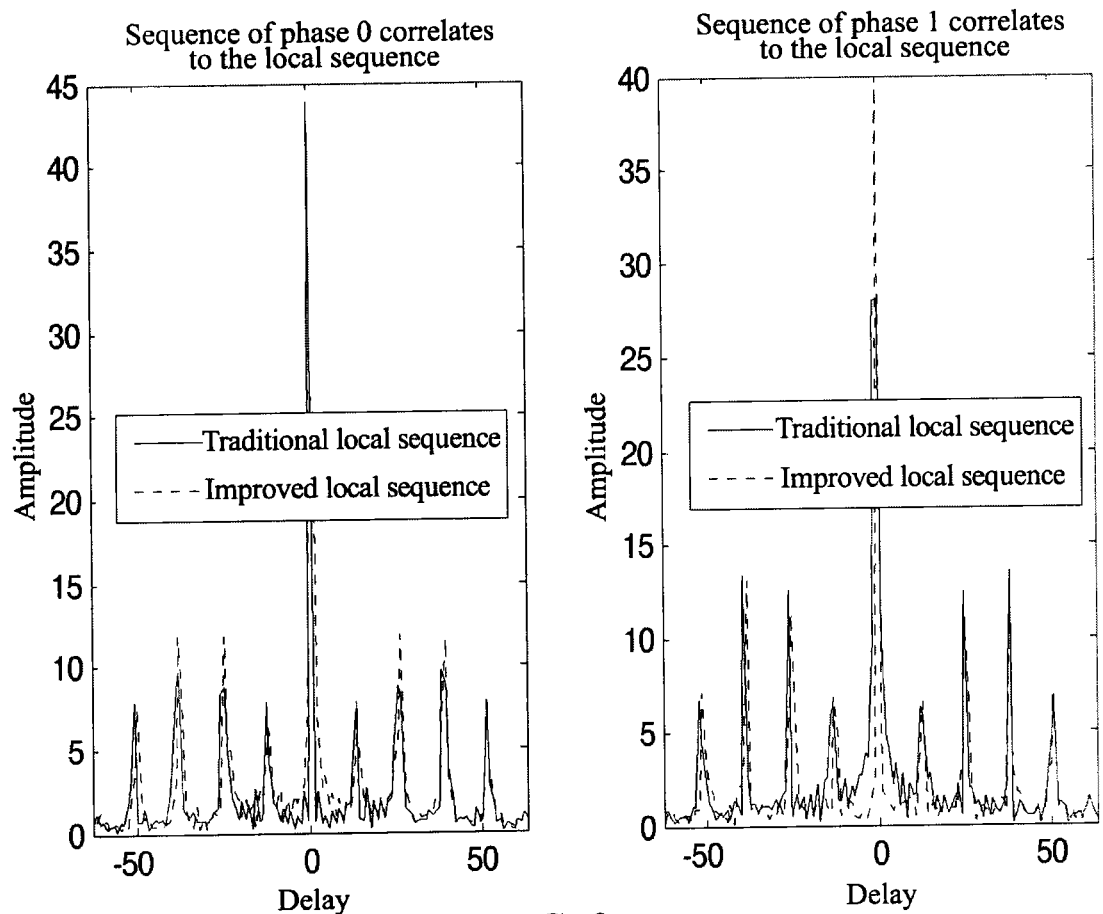
FIG. 2(a) is a schematic diagram of correlation values between a received signal and a local sequence when u=25.
Figure 2B:
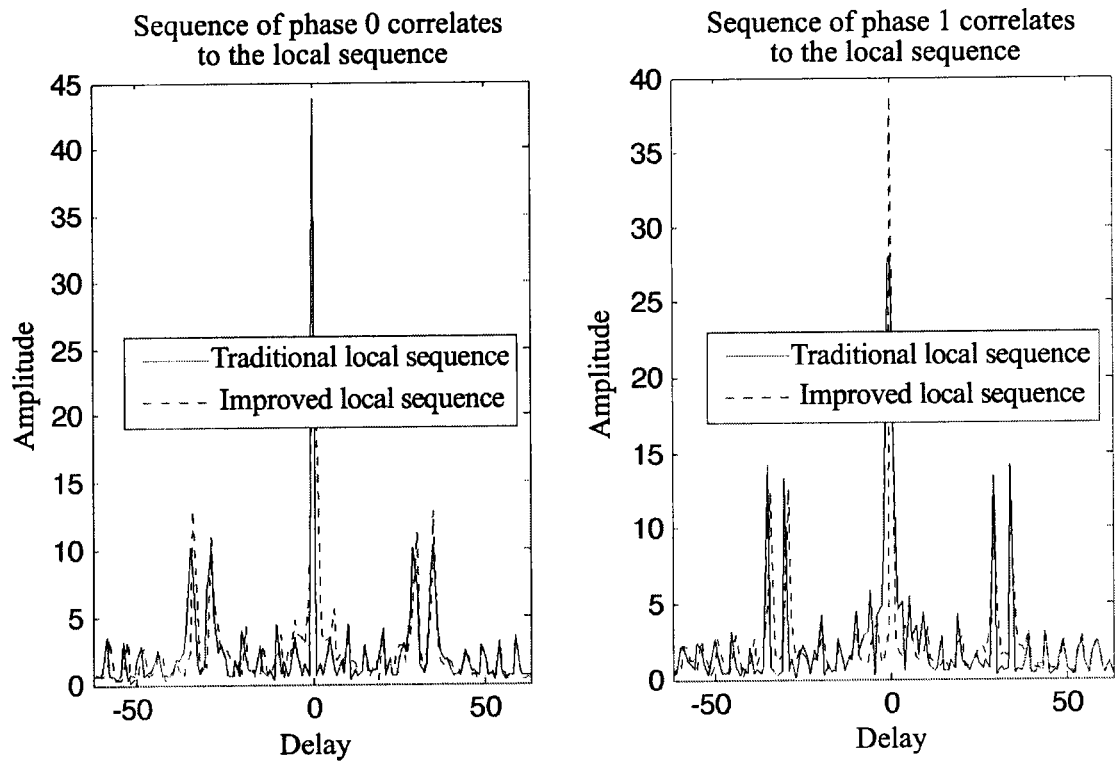
FIG. 2(b) is a schematic diagram of correlation values between a received signal and a local sequence when u=29.
Figure 2C:
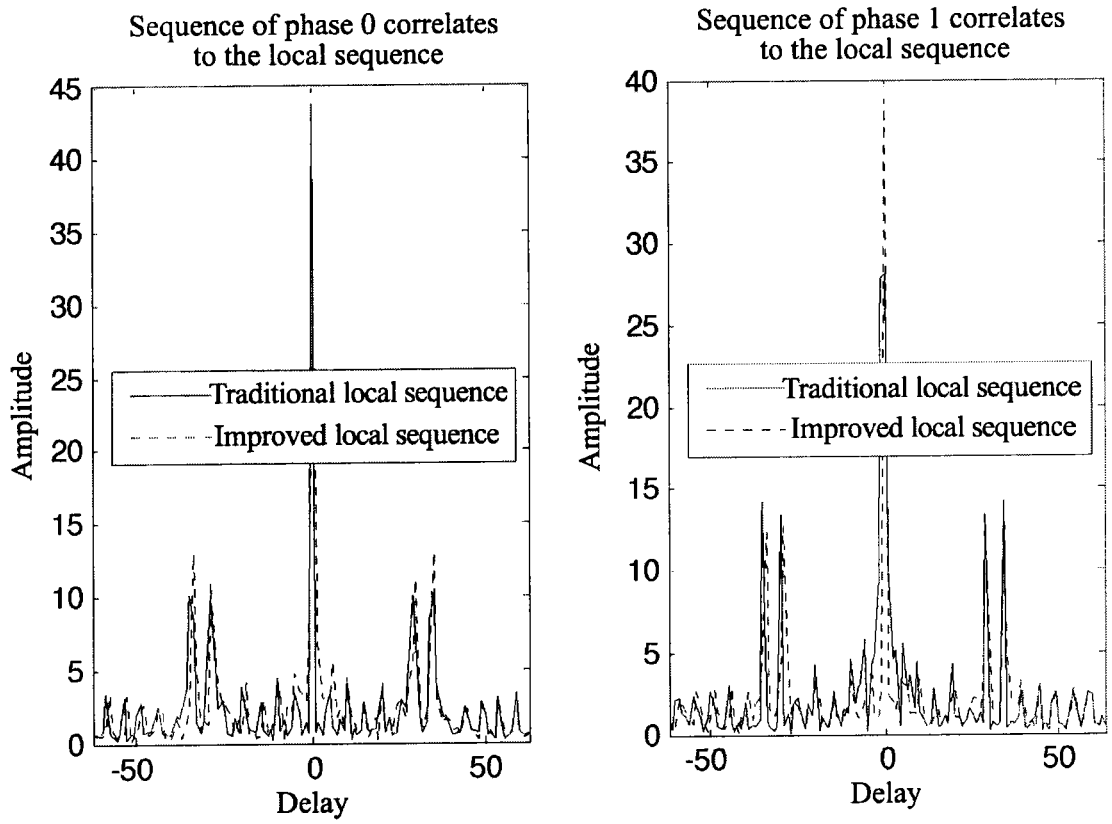
FIG. 2(c) is a schematic diagram of correlation values between a received signal and a local sequence when u=34.
Figure 3:
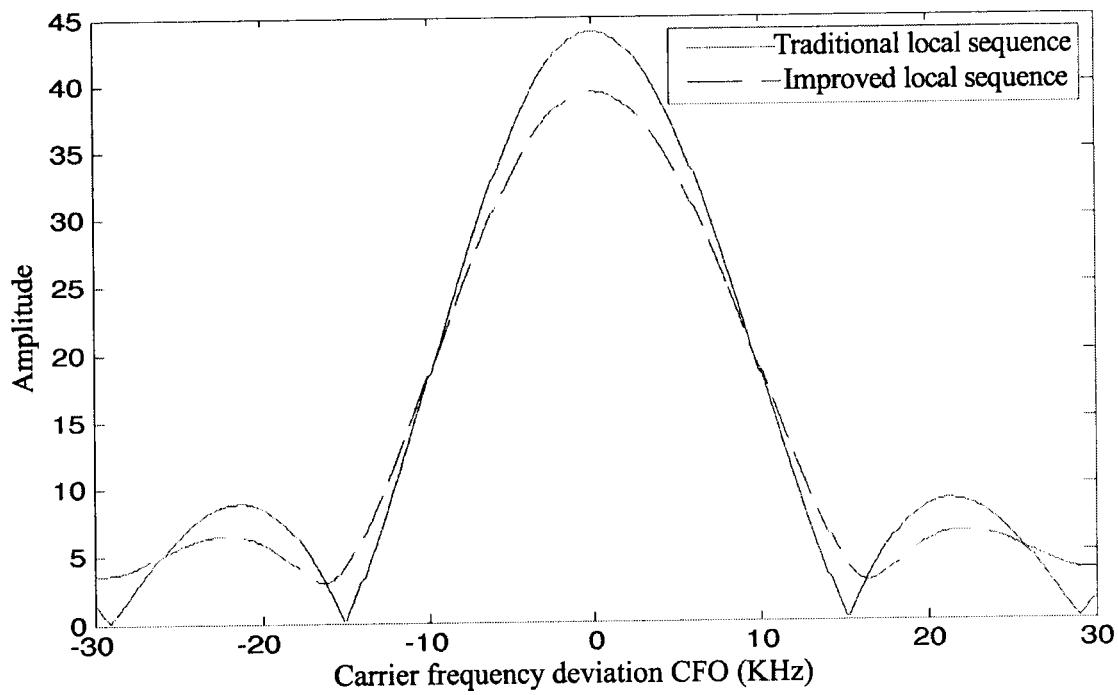
FIG. 3 is a schematic diagram of correlation peak values of different carrier frequency deviations.

There will be an initial phase deviation problem in the twice down sampling when the correlation operation is performed on the received signal and the local primary synchronization sequence, FIG. 2(a), FIG. 2(b) and FIG. 2(c) respectively show amplitude values when two kinds of initial phases correlate to the traditional local primary synchronization signal sequence as well as the improved local primary synchronization signal sequence generated by using the method of the present invention, in the case that u=25, 29 and 34. It can be seen from the figures, the performance of the correlation value between the transmitted sequence of the initial phase of 0 and the traditional local sequence is superior to the one of the correlation value between the transmitted sequence of the initial phase of 0 and the improved local sequence, while the opposite is true for the transmitted sequence of the initial phase of 1, and the correlation peak of the traditional method is slightly larger than that of the improved method. In addition, it can be seen from FIG. 3, the correlation peak obtained by adopting the traditional method is slightly superior to the one obtained by adopting the improved method.

However, compared to the traditional method, the performance loss of the improved method can be made up by increasing the number for averaging half-frames appropriately, that is, the search time is appropriately increased (ie, performing the above process repeatedly) to gain the reduction of the implementation complexity at the UE side as well as the storage overhead. Therefore, the performance loss brought by the improved scheme can be negligible.

The device for implementing the aforementioned method comprises a local sequence generation unit, a front-end processing unit, a filtering unit, and a judgment unit, wherein:

the local sequence generation unit is configured to generate a local primary synchronization signal sequence with equal amplitude in the time domain as a matched filter directly;

the front-end processing unit is configured to perform a front-end processing on the received signal, and to transmit the received signal after being processed to the filter unit;

the filter unit is configured to perform a matched filtering between the received signal after the front-end processing and the local primary synchronization signal sequence, and to transmit the signal sequence obtained after the matched filtering to the judgment unit;

the judgment unit is configured to judge the output amplitude of the signal sequence obtained after the matched filtering, so as to obtain a detection result of the primary synchronization signal sequence.

Preferably, the local sequence generation unit uses the following the formula to generate the local primary synchronization signal sequence:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62;$$

wherein, $\theta(u) = 4.75, -27.25, 27.25$, when $u=25, 29, 34$; $u^{-1}=28, 50, 13$, and $u^{-1}$ refers to the multiplicative inverse element of $u \bmod N_{ZC}$, $N_{ZC}=63$.

Preferably, the local sequence generation unit is further configured to split the local primary synchronization signal sequence to be in M channels after generating the local primary synchronization signal sequence: the local primary synchronization signal sequence of the $i^{th}$ channel being $x_u^*(n)e^{j2\pi \xi_i n/63}$, wherein, $n=0, 1, \ldots, 62$, $\xi_i$ is the preset normalized frequency deviation factor of the $i^{th}$ channel.

Preferably, the device further comprises a half-frame merging unit, which is configured: to receive the signal sequence sent by the matched filtering unit after the matched filtering, to perform a plurality of merging and averaging of 5 ms radio half-frames on the signal sequence obtained after the matched filtering, and to transmit the result of merging and averaging of the radio half-frames to the judgment unit.

For the project of digital baseband processor chip of LTE terminal, the specific steps of the flow for detecting the primary synchronization signal during the initial cell search process are as follows:

1) The local primary synchronization sequence with equal amplitude, namely the local matched filter, is generated; and the order of the matched filter is 62, that is the tap coefficient is 63.

Taking into account that the precision of the local oscillator is 5 ppm, and the carrier frequency is set to $3 \times 10^9$ Hz, therefore the receiver is spilt into three channels to receive in parallel, the additional carrier frequency deviations of the three channels are respectively −10 KHz, 0 Hz, and 10 KHz, that is the normalized frequency deviation factors are respectively $\xi_i = -\frac{2}{3}, 0, \frac{2}{3}$, and the precision of the rough filter frequency deviation estimation is 5 KHz.

2) A digital front-end processing is performed on the received signal, and the digital front-end processing mainly comprises ADC (digital-analog conversion), AGC (Automatic Gain Control), low pass filtering, and rate transform;

The sampling rate of the received signal after the low pass filtering is 1.92 MHz, and the bandwidth is 1.08 MHz at this time, and then the twice down sampling is performed to reach 0.96 MHz.

3) The received signal passes three channels of matched filters, and there are ZC local sequences of three root sequences correspondingly in each channel of matched filter to calculate the amplitude of the output of the matched filter. For three-channel parallel receiving, there are three root sequences corresponding to each channel, therefore, there are a total of nine output amplitude values.

4) In order to perform the timing synchronization of 5 ms, 5 ms cache is performed on the output amplitude value; in order to improve the performance, a plurality of averaging 5 ms half-frames are performed at the same time. 10 of averaging 5 ms half-frames are usually configured.

5) The maximum value is detected for the 9 of 5 ms output amplitude values and is judged; the sector number of the cell can be obtained from the root sequence corresponding to the maximum value meeting the condition, and the sample point where the maximum value appears is the timing synchronization point of the primary synchronization channel; and then the rough estimation of the carrier frequency deviation is obtained according to the channel where the maximum value appears.

6) If the condition is not met, the search is performed again, that is, the above steps from 1) to 5) are re-implemented.

Figure 4:
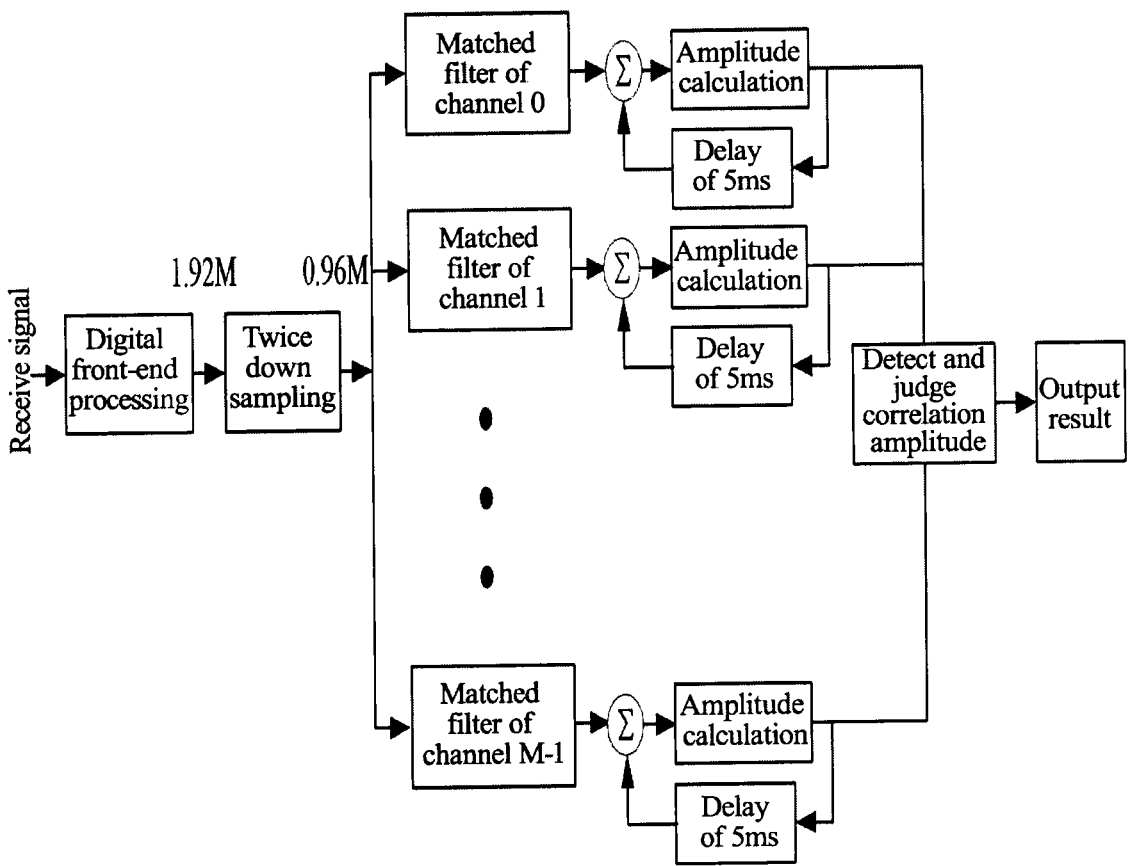
FIG. 4 is a flow chart of detecting a primary synchronization signal.

The device is as shown in FIG. 4, and the local sequence generation unit is not shown in the figure, which can be taken as one part of the terminal. The front-end processing unit comprises a digital front-end processing unit as well as a down sampling unit in the figure; the filtering unit comprises M channels of matched filters; the half-frame merging unit comprises an amplitude calculation unit, a delay unit, and a summing unit (Σ) in the figure; and the judgment unit comprises a detection and amplitude judgment unit, as well as a result outputting unit.

INDUSTRIAL APPLICABILITY

Compared with the existing technology, the present invention effectively reduces the computational complexity in the case that the detection performance remains unchanged largely. At the same time, the robustness of the carrier frequency is enhanced by the multi-channel parallel detection. The present invention is applicable to the initial cell search in a LTE system of both FDD and TDD duplex structure at the same time, with a good value of the engineering application.

What is claimed is:

1. A method for detecting a primary synchronization signal in a Long Term Evolution (LTE) system, comprising:
   directly generating a local primary synchronization signal sequence with equal amplitude in time domain as a matched filter; and
   performing a front-end processing for a received signal; performing matched filtering between the received signal after the front-end processing and the local primary synchronization signal sequence; judging output amplitude of the signal sequence obtained after the matched filtering; and then obtaining a judgment result of the local primary synchronization signal sequence;

wherein the local primary synchronization signal sequence is generated by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62$$

wherein, $\theta(u)$=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63.

2. The method of claim 1, wherein,
the front-end processing comprises an analog-digital conversion, an automatic gain control, a low-pass filtering and rate transform; and a sampling rate of the received signal after the front-end processing is 0.96 MHz.

3. The method of claim 1, further comprising:
splitting the local primary synchronization signal sequence to be in M channels after generating the local primary synchronization signal sequence:
the local primary synchronization signal sequence of an $i^{th}$ channel is $x_u^*(n)e^{j2\pi\xi_i n/63}$, wherein, n=0, 1, . . . , 62, $\xi_i$ is a preset normalized frequency deviation factor of the $i^{th}$ channel.

4. The method of claim 1, wherein, the step of judging output amplitude of the signal sequence obtained after the matched filtering and obtaining a judgment result of the local primary synchronization signal comprises:
judging the output amplitude output from the matched filter, and selecting a sequence number corresponding to a sequence meeting a condition of a preset amplitude peak to be taken as a sequence index of the primary synchronization signal sequence of a transmitted signal;
obtaining by calculation a rough estimate of a channel carrier frequency deviation: $\Delta \hat{f}$=−$\xi_i$×15000 MHz according to a normalized frequency deviation factor of the sequence meeting the condition of the preset amplitude peak.

5. The method of claim 1, further comprising:
before the judgment, performing a plurality of merging and averaging of 5 ms radio half-frames on the signal sequence obtained after the matched filtering, and then judging the result of merging and averaging of the radio half-frames.

6. A method for generating a primary synchronization signal sequence in a Long Term Evolution (LTE) system, comprising:
directly generating a local primary synchronization signal sequence with equal amplitude in time domain;
wherein the local primary synchronization signal sequence with equal amplitude is directly generated in the time domain by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62;$$

wherein, $\theta(u)$=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63.

7. A device for detecting a primary synchronization signal in a Long Term Evolution (LTE) system, comprising at least one processor executing a local sequence generation unit, a front-end processing unit, a filtering unit and a judging unit, wherein:
the local sequence generation unit is configured to generate a local primary synchronization signal sequence with equal amplitude in time domain as a matched filter directly;
the front-end processing unit is configured to perform a front-end processing on a received signal, and to transmit the received signal after being processed to the filtering unit;
the filtering unit is configured to perform a matched filtering between the received signal after the front-end processing and the local primary synchronization signal sequence, and to transmit the signal sequence obtained after the matched filtering to the judging unit;
the judging unit is configured to judge output amplitude of the signal sequence obtained after the matched filtering, so as to obtain a judgment result of the primary synchronization signal sequence;
wherein the local sequence generation unit is configured to generate the local primary synchronization signal sequence by the following formula:

$$x_u(n) = e^{-j2\pi \frac{31n+\theta(u)}{63}} e^{-j\pi u \frac{(-n \times u^{-1})(-n \times u^{-1}+1)}{63}}, n = 0, 1, \ldots, 62;$$

wherein, $\theta(u)$=4.75, −27.25, 27.25, when u=25, 29, 34; $u^{-1}$=28, 50, 13, and $u^{-1}$ refers to a multiplicative inverse element of u mod $N_{ZC}$, $N_{ZC}$=63.

8. The device of claim 7, wherein,
the front-end processing unit is configured to perform the following front-end processing on the received signal: an analog-digital conversion, an automatic gain control, a low-pass filtering and rate transform;
a sampling rate of the received signal after the front-end processing is 0.96 MHz.

9. The device of claim 7, wherein,
the local sequence generation unit is further configured to split the local primary synchronization signal sequence to be in M channels after generating the local primary synchronization signal sequence: the local primary synchronization signal sequence of an $i^{th}$ channel being $x_u^*(n)e^{j2\pi\xi_i n/63}$, wherein, n=0, 1, . . . , 62, $\xi_i$ is a preset normalized frequency deviation factor of the $i^{th}$ channel.

10. The device of claim 9, wherein,
the device further comprises a half-frame merging unit, the half-frame merging unit is configured: to receive the signal sequence sent by the matched filtering unit after the matched filtering, to perform a plurality of merging and averaging of 5 ms radio half-frames on the signal sequence obtained after the matched filtering, and to transmit the result of merging and averaging of the radio half-frames to the judgment unit to be judged.

11. The method of claim 4, further comprising:
before the judgment, performing a plurality of merging and averaging of 5 ms radio half-frames on the signal sequence obtained after the matched filtering, and then judging the result of merging and averaging of the radio half-frames.

* * * * *